United States Patent
Cheng et al.

(10) Patent No.: US 7,894,025 B2
(45) Date of Patent: Feb. 22, 2011

(54) PATTERNED COLOR FILTER SUBSTRATE AND LCD UTILIZING THE SAME

(75) Inventors: Ching-Sheng Cheng, Hsinchu (TW); Chih-Jen Hu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 12/723,809

(22) Filed: Mar. 15, 2010

(65) Prior Publication Data
US 2010/0165273 A1    Jul. 1, 2010

Related U.S. Application Data

(63) Continuation of application No. 11/759,329, filed on Jun. 7, 2007, now abandoned.

(30) Foreign Application Priority Data

Dec. 1, 2006   (TW) ............................... 95144656 A

(51) Int. Cl.
*G02F 1/1335* (2006.01)
*G02F 1/1339* (2006.01)

(52) U.S. Cl. ...................... 349/106; 349/155

(58) Field of Classification Search ......... 349/106–111, 349/155–157
See application file for complete search history.

(56) References Cited

U.S. PATENT DOCUMENTS

| | | | |
|---|---|---|---|
| 5,815,232 A * | 9/1998 | Miyazaki et al. ............ | 349/155 |
| 6,671,025 B1 * | 12/2003 | Ikeda et al. ................. | 349/156 |
| 2001/0017677 A1 | 8/2001 | Kishimoto et al. | |
| 2003/0179337 A1 * | 9/2003 | Park et al. ................... | 349/153 |
| 2004/0075788 A1 | 4/2004 | Cheng | |
| 2004/0114087 A1 * | 6/2004 | Cho et al. ................... | 349/155 |
| 2004/0227895 A1 | 11/2004 | Yoo et al. | |

2005/0225702 A1   10/2005   Yi (Continued)

FOREIGN PATENT DOCUMENTS

CN          1503012 A       6/2004

(Continued)

OTHER PUBLICATIONS

CN Office Action mailed Nov. 2, 2007.

(Continued)

*Primary Examiner*—Mark A Robinson
*Assistant Examiner*—Michael Inadomi
(74) *Attorney, Agent, or Firm*—Thomas, Kayden, Horstemeyer & Risley

(57) ABSTRACT

An LCD including a color filter substrate, an array substrate, and a liquid crystal layer therebetween is provided. This color filter substrate has a plurality of color filters with overlap regions acting as a black matrix. Subsequently, patterned regions are defined in part of the overlap regions. After formation of a planarization layer and a conductive layer, spacers are formed in the patterned regions. The spacers may not shield the transparent region of the color filters, thereby enhancing the aperture ratio of the color filter substrate. Additionally, the thickness of the planarization layer in the patterned regions is not influenced by the overlap of the color filters, such that the spacers thereon have a uniform height. Furthermore, the at least one spacer of the color filter substrate and at least one data line of the array substrate are overlapped.

20 Claims, 10 Drawing Sheets

U.S. PATENT DOCUMENTS

2005/0264728 A1    12/2005  Funahata et al.
2006/0028598 A1 *  2/2006   Lee et al. .................... 349/107

FOREIGN PATENT DOCUMENTS

| CN | 1808191 | A | 7/2006 |
|---|---|---|---|
| CN | 1847943 | A | 10/2006 |

OTHER PUBLICATIONS

CN Office Action mailed Feb. 1, 2008.
English abstract of CN1847943, pub. Oct. 18, 2006.
English abstract of CN1503012, pub. Jun. 9, 2004.

* cited by examiner

PATTERNED COLOR FILTER SUBSTRATE AND LCD UTILIZING THE SAME

CROSS REFERENCE TO RELATED APPLICATIONS

This application is a Continuation of pending U.S. patent application Ser. No. 11/759,329, filed Jun. 7, 2007, and entitled "Color Filter Substrate And LCD Utilizing The Same", which claims priority of Taiwan Patent Application No. 095144656, filed on Dec. 1, 2006, the entirety of which is incorporated by reference herein.

BACKGROUND OF THE INVENTION

1. Field of the Invention

The invention relates to a liquid crystal display (LCD), and in particular to a color filter substrate thereof.

2. Description of the Related Art

Conventional LCDs comprise a color filter substrate, an array substrate, and a liquid crystal layer disposed therebetween. Formerly, the distance between the substrates was defined by ball spacers. However, no method existed to regulate distribution thereof, so use of a patterned photoresist layer as a spacer became popular.

Conventional large color filter substrates include black matrices between different color filters, with middle or small color filter substrates serving in overlap regions of different color filters as black matrices. As shown in FIGS. 1A and 1B, the color filter substrate includes red, green, and blue color filters 10R, 10G, and 10B on a substrate 11, wherein the color filters overlap to form the overlap regions 12A and 12B. FIG. 1B is a section view of line X-X' in FIG. 1A, defining the overlap regions. The thickness of overlap regions 12A and 12B is influenced by the overlap of two color filters. To ensure spacers have uniform height, spacers are preferably formed beyond the overlap region. For example, the spacer 14 is formed in the corner of transparent region of the color filter 10R in FIG. 1A. Thus, spacer 14 formed in transparent region of any color filter will reduce aperture ratio of the color filter. If the spacer 14 is directly formed in the overlap region 12A or 12B, the overlap difference of color filters 12R, 12G, and 12B will result in different heights of spacers 14. Thus, a method is called for forming uniform height spacers without reducing aperture ratio.

BRIEF SUMMARY OF THE INVENTION

Accordingly, the invention provides a liquid crystal display, comprising a color filter substrate, comprising: a substrate; a first color filter formed on the substrate; a second color filter formed on the substrate, wherein the first color filter and the second color filter overlap to form an overlap region; a conductive layer on the first and second color filters; and at least one spacer formed in the overlap region; an array substrate, comprising: at least one data line, wherein the at least one spacer and the at least one data line are overlapped; and a liquid crystal layer disposed between the color filter substrate and the array substrate.

The invention also provides a liquid crystal display, comprising a color filter substrate, comprising: a substrate; a first color filter formed on the substrate; a second color filter formed on the substrate, wherein the first color filter and the second color filter overlap to form an overlap region, wherein the overlap region comprises a patterned region and an non-patterned region; a conductive layer on the first and second color filters; and at least one spacer formed in the overlap region; an array substrate, comprising: at least one data line, wherein the at least one spacer and the at least one data line are overlapped; and a liquid crystal layer disposed between the color filter substrate and the array substrate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
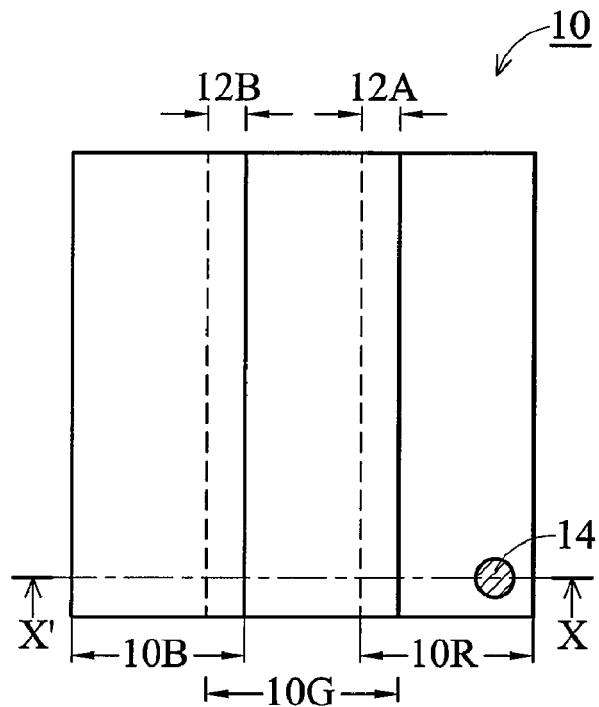
FIG. 1A is a top view of a conventional color filter substrate.
Figure 1B:
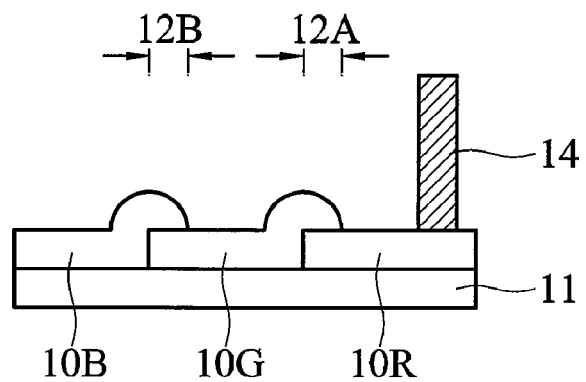
FIG. 1B is a section view of line X-X' in FIG. 1A.
Figure 2A:
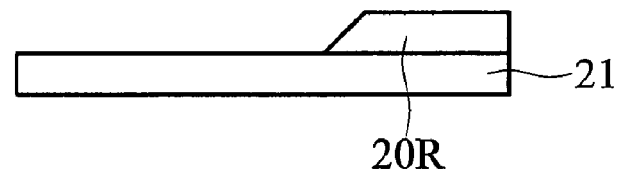
FIGS. 2A-2C, 4A-4C, 5A-5C, 6A-6D, 7A-7C, 8A-8C, and 9A-9C are section views of manufacture of a color filter substrate in an embodiment of the invention.
Figure 2B:
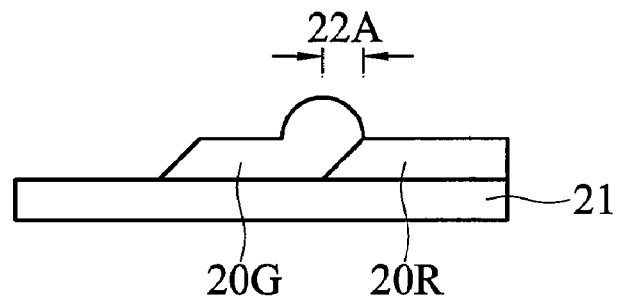
Figure 2C:
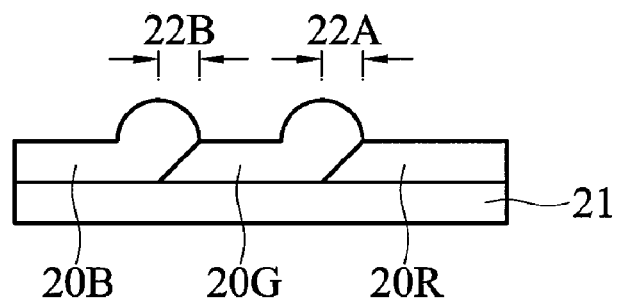

FIGS. 2A-2C show a manufacture of a color filter substrate in an embodiment of the invention. First, a red color filter 20R is formed on a substrate 21. The formation may utilize a photoresist containing red pigment spun on the substrate 21. In an embodiment, the substrate 21 can be plastic, resin, glass, or the like. The color filter 20R is then patterned by lithography, for example. As shown in FIG. 2B, a green color filter 20G is formed on the substrate 21. The composition and the formation of the color filter 20G are similar to color filter 20R. Similarly, a blue color filter 20B is then formed on the substrate 21 in FIG. 2C. As shown in FIG. 2C, part of the color filter 20G remains on color filter 20R to form an overlap region 22A. Similarly, part of the color filter 20B remains on the color filter 20G to form an overlap region 22B. The formation sequence of color filters is not limited to red, green, and blue. Nor are the color filters limited to the three conventional primary colors, and may include other colors such as cyan, yellow, or magenta. The overlap regions 22A and 22B can be the same or different. For example, because mixture of green light and blue light is easier than mixture of green light and red light, the overlap region 22B is preferably larger than the overlap region 22A to reduce color mixture. Because the aperture ratio of the overlap region 22A and 22B is less than the transparent region of the color filters, the overlap regions 22A and 22B serve as black matrices, such that the process of forming additional black matrices may be ignored.

Figure 3:
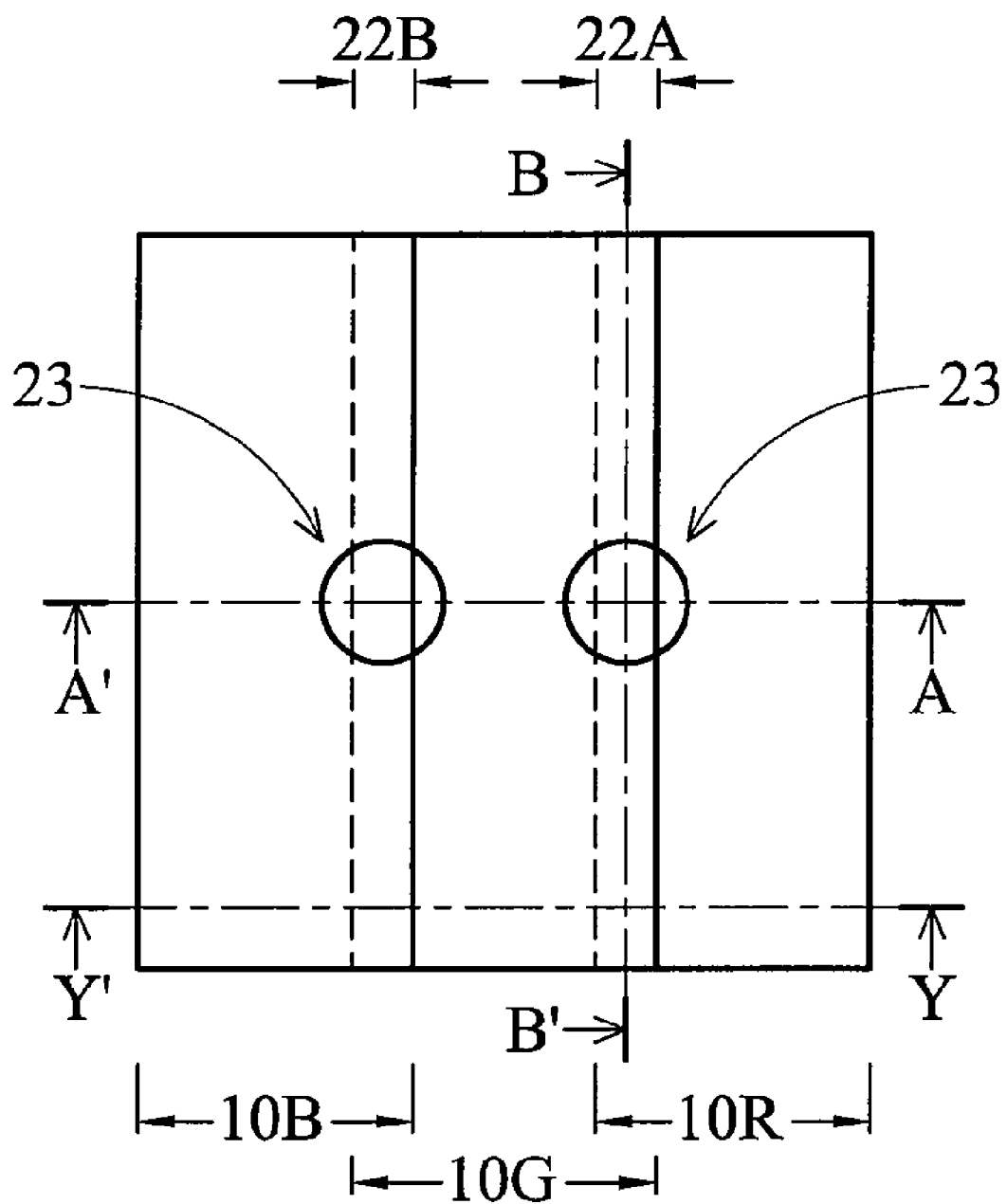
FIG. 3 is a top view of a color filter substrate in an embodiment of the invention.

FIG. 3 is a top view of the disclosed structure, and FIG. 2C a section view of line Y-Y' in FIG. 3. In FIG. 2C, the overlap regions 22A and 22B are formed by left color filters (e.g. 20G or 20B) covering right color filters (e.g. 20R or 20G). In another embodiment, it is optional that right color filters cover left color filters. In further embodiments, outside color filters (e.g. 20R and 20B) can cover middle color filter (e.g. 20G), and vice versa. Color filters 20R, 20G, and 20B have tilt boundary as shown in FIG. 2C, however, their boundary can be perpendicular to the substrate if necessary.

Figure 4A:
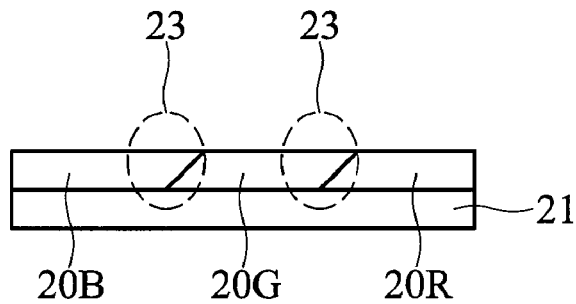
Figure 4B:
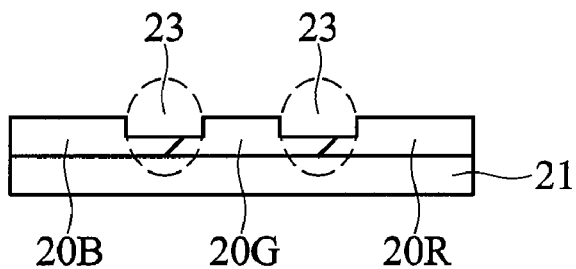
Figure 5A:
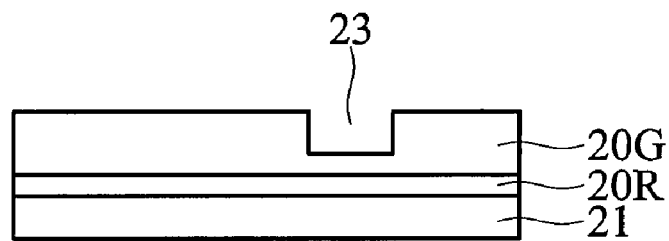
Figure 5B:
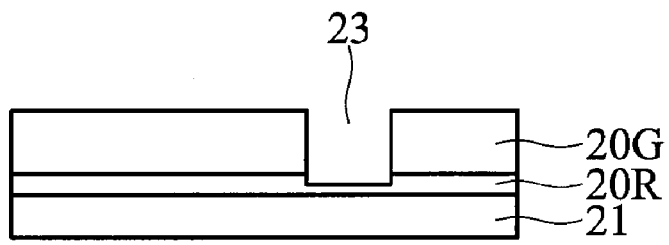
Figure 5C:
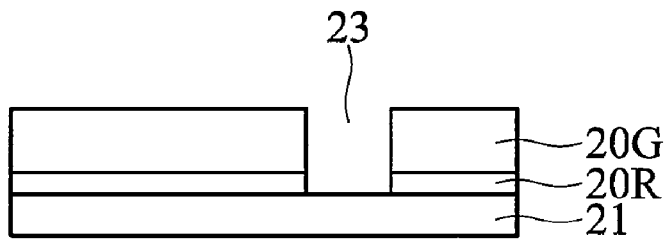

Unlike the conventional technology, when color filters 20R, 20G, and 20B are patterned, the patterned region 23 is simultaneously formed as shown in FIG. 3. Formation of the patterned region 23 preferably first comprises forming a photoresist layer (not shown) on non-patterned color filters. The photoresist layer is then patterned by lithography, for example. Subsequently, the patterned regions 23 of the color filters 23R, 23G, and 23B (not masked by the patterned photoresist layer) are removed. Suitable removal methods comprise dry etching such as reactive ion etching (RIE) or plasma etching. In other embodiments, the patterned regions 23 can be formed by laser ablation, such as direct writing or utilizing a photo mask. FIG. 4A shows a section view of line A-A' in FIG. 3, wherein patterned regions 23 are lower than the top surface of the overlap region 22A. The patterned regions 23 and the top surface of the color filters 20R, 20G, 20B are of the same height. In other embodiments, the patterned regions 23 can be openings in FIG. 4B lower than the top surface of the color filters 20R, 20G, and 20B. In further embodiments, the patterned regions 23 can expose the substrate 21. FIGS. 5A-5C show a section view of line B-B' in FIG. 3 at about the middle of the overlap region 22A. As shown in FIG. 5A, the patterned region 23 and the color filters 20R are of the same height, such that color filter 20R is covered by the color filter 20G in the patterned region 23. As shown in FIG. 5B, the patterned region 23 is an opening, and part of the color filter 20R is exposed in the patterned region 23. As shown in FIG. 5C, the patterned region 23 exposes part of the substrate 21. The described patterned regions 23 and the overlap regions 22A/22B may be of the same or different widths. Additionally, patterned regions 23 are not formed in all overlap regions 22A and 22B, only being formed in part of the overlap regions 22A and 22B if necessary. While patterned regions 23 are circular in FIG. 3, other shapes such as square, rectangle, rhomb, hexagon, or ellipse are possible. The width of the overlap region 22A and 22B can be the same or different.

Figure 4C:
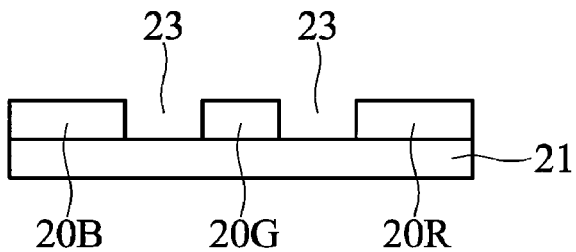
Figure 6A:
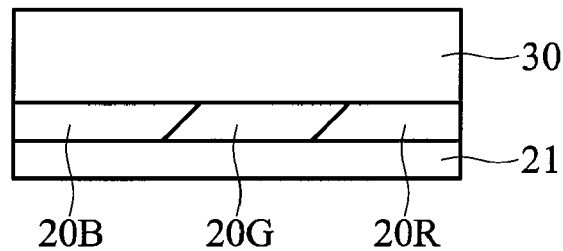
Figure 6B:
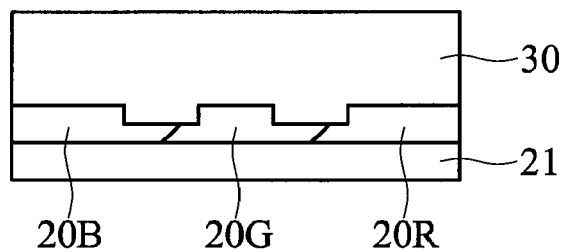
Figure 6C:
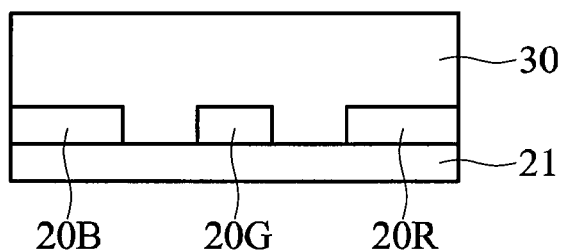
Figure 6D:
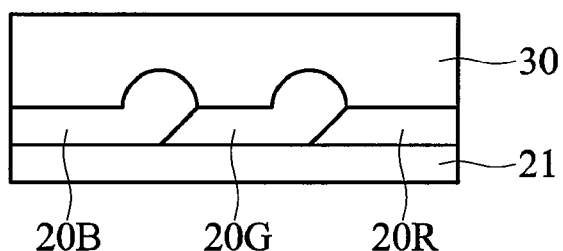
Figure 7A:
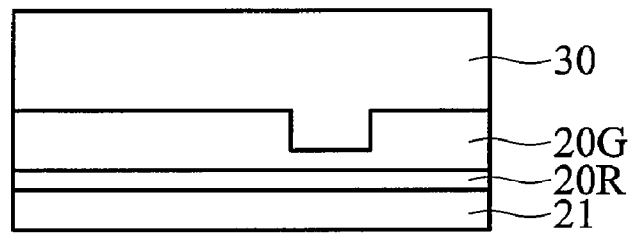
Figure 7B:
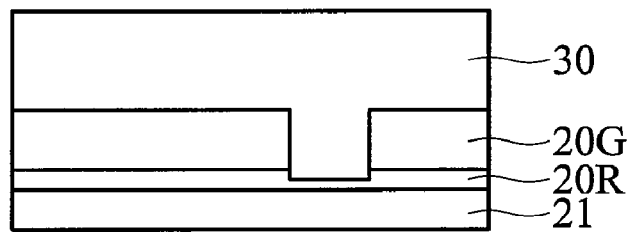
Figure 7C:
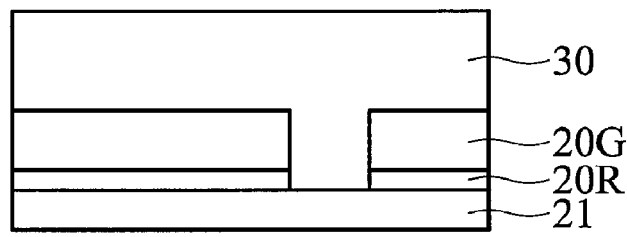

A planarization layer 30 is then formed overlying the described structure, as shown in FIGS. 6A-6C. FIGS. 6A-6C correspond to line A-A' in FIG. 3. The planarization layer 30 can be transparent material, organic material, or combinations thereof. The openings in FIGS. 4B-4C are filled by the planarization layer 30 to complete a smooth top surface. FIG. 6D shows the structure, after formation of the planarization layer 30, continued from FIG. 2C corresponding to line Y-Y' in FIG. 3. Overlap regions 22A and 22B have a higher top surface than color filters 20R, 20G 20B other than the overlap regions, however, the top surface of the planarization layer 30 can be planarized to be uniformly smooth by back etching. FIGS. 7A-7C show the structure, after formation of the planarization layer 30, continued from the FIGS. 5A-5C corresponding to line B-B' in FIG. 3. Irrespective of whether or not the patterned regions 23 are of the same height as shown in FIGS. 4A and 5A, openings as in FIGS. 4B and 5B, or exposed substrate 21 as in FIGS. 4C and 5C, the planarization layer 30 has a smooth top surface. It is clearly shown in figures that the planarization layer 30 is thickest on patterned region 30, thinner on color filters 20R, 20G, and 20B, and thinnest (can be zero) on the overlap regions 22A and 22B. In an embodiment, the planarization layer 30 has a thickness of about 0 μm to 10 μm, and more preferably of about 0.5μm to 4 μm.

Figure 8A:
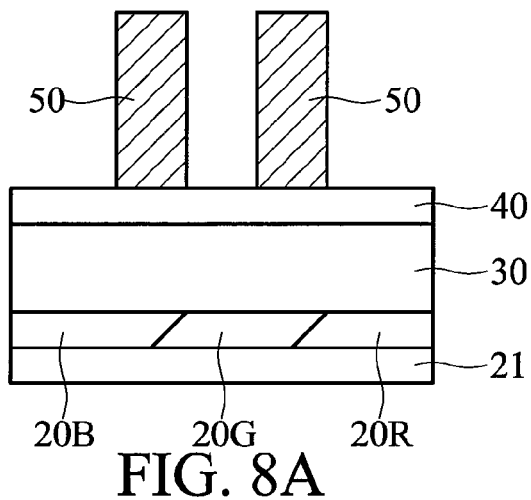
Figure 8B:
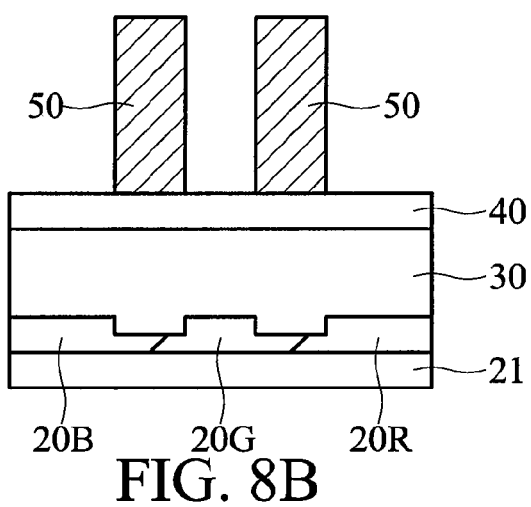
Figure 8C:
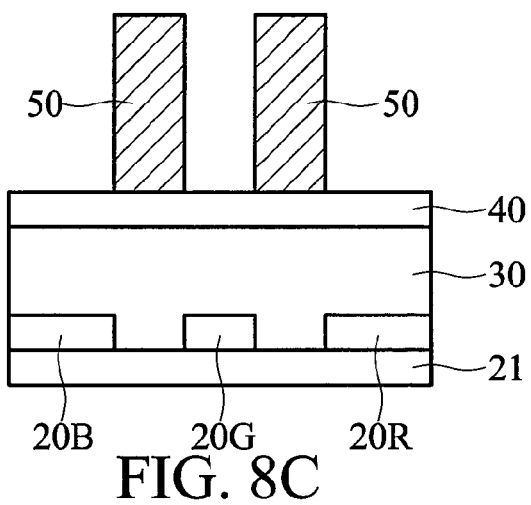
Figure 9A:
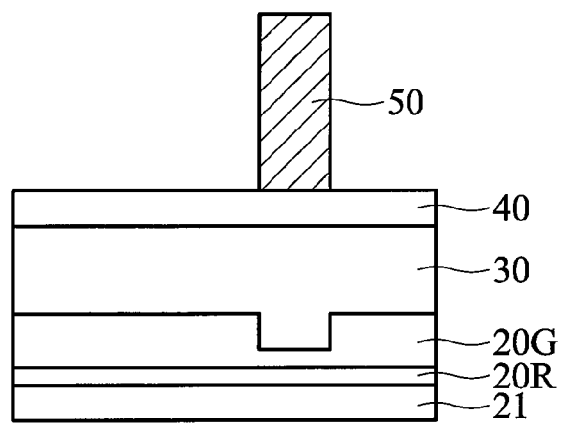
Figure 9B:
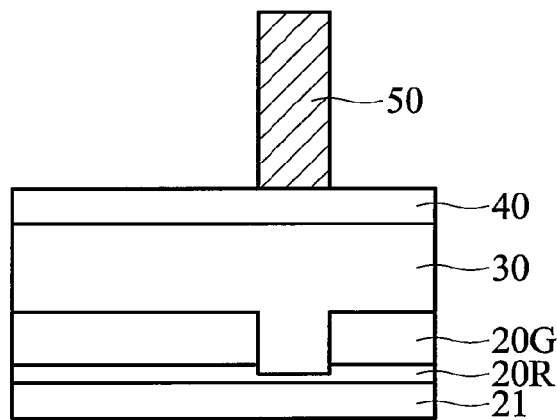
Figure 9C:
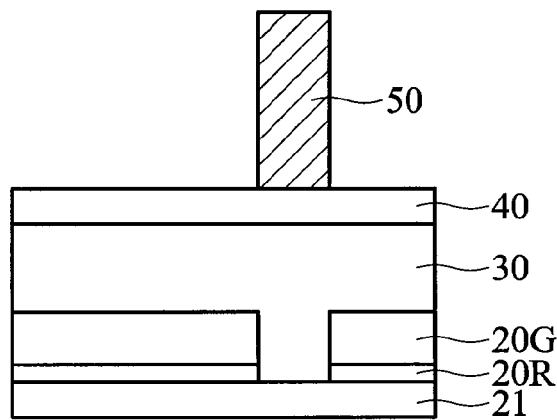

After formation of a conductive layer 40 on the structure, spacers 50 are formed in the patterned region 23. Generally, the conductive layer 40 can be indium tin oxide (ITO), indium zinc oxide (IZO), or aluminum zinc oxide (AZO), and have a thickness of about 400 Å to 2000 Å. Suitable spacers 50 include positive or negative photoresist. FIGS. 8A-8C continue from FIGS. 6A-6C, and FIGS. 9A-9C continue from FIGS. 7A-7C, respectively. Compared to the conventional technology, the patterned regions 23 of the present embodiments unlike the overlap regions 22A and 22B influenced by the overlap of the color filters 20R, 20G, and 20B, such that the spacers 50 formed overlying the patterned regions 23 have uniform height. Especially in FIG. 8C, since only planarization layer 30 and conductive layer 40 formed on the exposed substrate 21 in the patterned regions 23, the influence from color filters 20R, 20G, and 20B to spacers 50 can be totally eliminated. In addition, the spacers 50 are not formed in the transparent regions of the color filters, thereby retaining the aperture ratio. Note that while spacers 50 have a rectangular cross section in illustration, they may be ladder-shaped with narrow top and wide bottom, conical, or other suitable shape. FIGS. 8A-8C show two spacers in three color filters, but the spacer density is not limited thereto. In other words, part of the patterned regions 23 may be free of spacer 50. If color filters 20R, 20G, and 20B are large, dense spacers are needed. If color filters 20R, 20G, and 20B are small, it is possible that several sets of color filters 20R, 20G and 20B need only one spacer 50. As long as the support is sufficient, the skilled may optionally tune the spacer 50 factors such as density, shape, color, size, material, and number.

Figure 10:
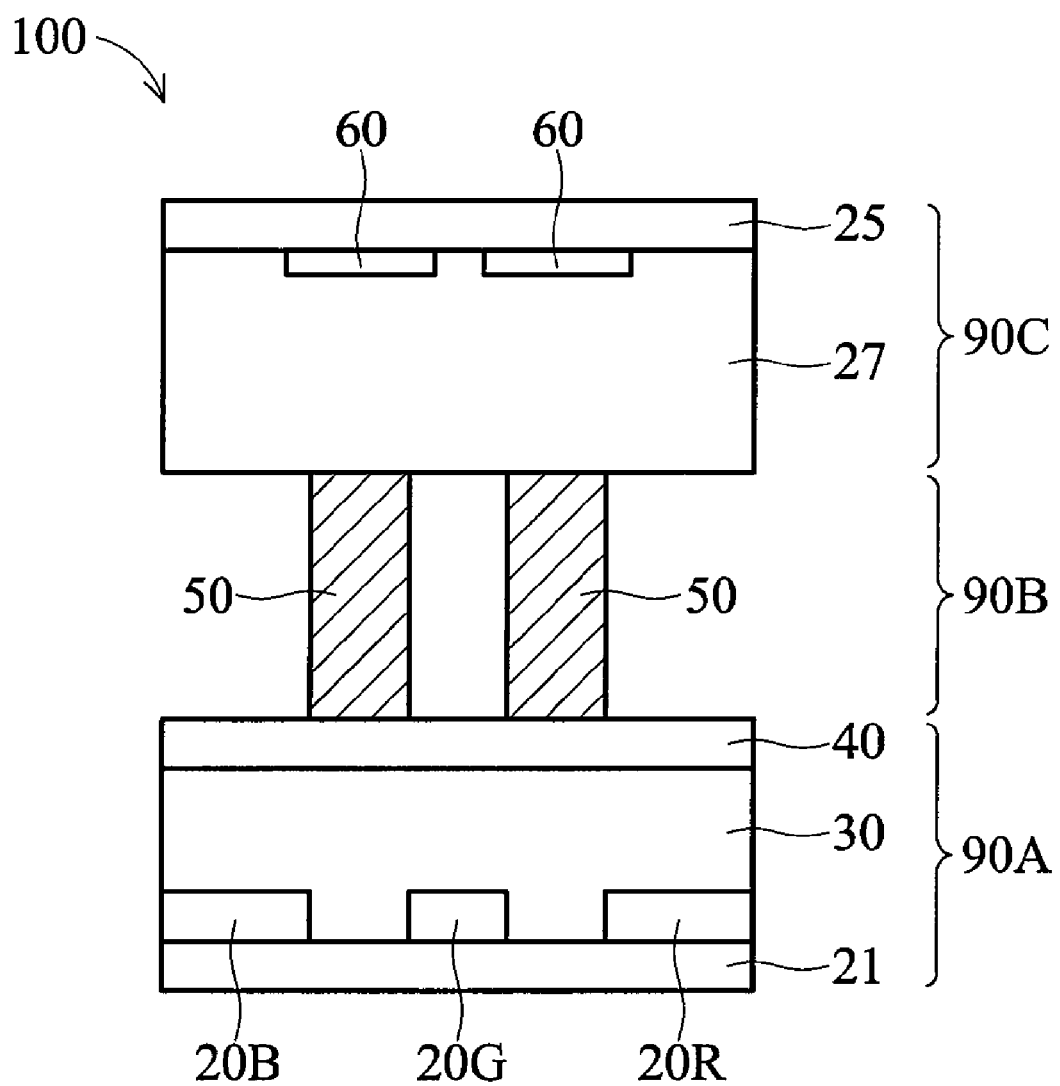
FIG. 10 is a section view of a liquid crystal display in an embodiment of the invention.

Using the color filter substrate in FIG. 8C as an example, a liquid crystal layer is disposed between the color filter substrate and an array substrate to form a liquid crystal display. As shown in FIG. 10, the bottom substrate is color filter substrate 90A with description thereof omitted for brevity. The top substrate is the array substrate 90C. The substrate 25 of the array substrate 90C is similar to substrate 21. In the multi-layered structure 27, data lines 60 are preferably wider than the patterned regions 23 or overlap regions 22A and 22B (please referring to FIG. 10). The liquid crystal layer 90B is disposed between the color filter substrate 90A and the array substrate 90C to complete the liquid crystal display 100 of the present embodiments.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
   a color filter substrate, comprising:
      a substrate;
      a first color filter formed on the substrate;
      a second color filter formed on the substrate, wherein the first color filter and the second color filter overlap to form an overlap region comprising a patterned region and a non-patterned region;
      a planarization layer covering the first and the second color filters, wherein the planarization layer in the patterned region is thicker than the planarization layer on the first and the second color filters out of the patterned region;
      a conductive layer on the planarization layer; and
      at least one spacer formed in the overlap region;
   an array substrate, comprising:
      at least one data line, wherein the at least one spacer and the at least one data line are overlapped; and
      a liquid crystal layer disposed between the color filter substrate and the array substrate.

2. The liquid crystal display as claimed in claim 1, wherein the at least one spacer is located in the patterned region.

3. The liquid crystal display as claimed in claim 2, wherein the at least one spacer is not located in the non-patterned region.

4. The liquid crystal display as claimed in claim 2, wherein the patterned region exposes part of the color filters.

5. The liquid crystal display as claimed in claim 2, wherein the patterned region creates a discontinuity in the overlap regions and exposes part of the substrate, and wherein the at least one spacer is located in the discontinuity.

6. The liquid crystal display as claimed in claim 5, wherein the first and second filters in the discontinuity do not contact.

7. The liquid crystal display as claimed in claim 2, wherein the patterned region is circular, square, rectangular, rhomboid, hexagonal, or elliptical.

8. The liquid crystal display as claimed in claim 2, wherein a width of the overlap region and a width of the patterned region are the same.

9. The liquid crystal display as claimed in claim 1, wherein the at least one data line has a wider width than the overlap region.

10. A liquid crystal display, comprising:
a color filter substrate, comprising:
a substrate;
a first color filter formed on the substrate;
a second color filter formed on the substrate, wherein the first color filter and the second color filter overlap to form an overlap region, wherein the overlap region comprises a patterned region and a non-patterned region;
a planarization layer covering the first and the second color filters, wherein the planarization layer in the patterned region is thicker than the planarization layer on the first and the second color filters out of the patterned region;
a conductive layer on the planarization layer; and
at least one spacer formed in the overlap region;
an array substrate, comprising:
at least one data line, wherein the at least one data line and the overlap region are substantially overlapped; and
a liquid crystal layer disposed between the color filter substrate and the array substrate.

11. The liquid crystal display as claimed in claim 10, wherein the at least one spacer is located in the patterned region.

12. The liquid crystal display as claimed in claim 10, wherein the at least one spacer is not located in the non-patterned region.

13. The liquid crystal display as claimed in claim 10, wherein the patterned region exposes part of the color filters.

14. The liquid crystal display as claimed in claim 10, wherein the patterned region is circular, square, rectangular, rhomboid, hexagonal, or elliptical.

15. The liquid crystal display as claimed in claim 10, wherein a width of the overlap region and a width of the patterned region are the same.

16. The liquid crystal display as claimed in claim 10, wherein the patterned region creates a discontinuity in the overlap regions and exposes part of the substrate, and the at least one spacer is located in the discontinuity, and wherein the first and second filters in the discontinuity do not contact.

17. The liquid crystal display as claimed in claim 10, wherein the at least one data line has a wider width than the overlap region.

18. A liquid crystal display, comprising:
a color filter substrate, comprising:
a substrate;
a first color filter formed on the substrate;
a second color filter formed on the substrate, wherein the first color filter and the second color filter overlap to form an overlap region comprising a patterned region and a non-patterned region, and wherein the patterned region creates a discontinuity in the overlap region and exposes part of the substrate;
a conductive layer on the first and second color filters; and
at least one spacer formed in the discontinuity;
an array substrate, comprising:
at least one data line, wherein the at least one spacer and the at least one data line are overlapped; and
a liquid crystal layer disposed between the color filter substrate and the array substrate.

19. The liquid crystal display as claimed in claim 18, wherein the first and second filters in the discontinuity do not contact.

20. A liquid crystal display, comprising:
a color filter substrate, comprising:
a substrate;
a first color filter formed on the substrate;
a second color filter formed on the substrate, wherein the first color filter and the second color filter overlap to form an overlap region comprising a patterned region and a non-patterned region, and wherein a width of the overlap region and a width of the patterned region are the same;
a conductive layer on the first and second color filters; and
at least one spacer formed in the overlap region;
an array substrate, comprising:
at least one data line, wherein the at least one spacer and the at least one data line are overlapped; and
a liquid crystal layer disposed between the color filter substrate and the array substrate.

* * * * *